Patented Jan. 14, 1941

2,228,667

UNITED STATES PATENT OFFICE 2,228,667

PROTECTIVE COATING COMPOSITION

George D. Martin, Nitro, W. Va., assignor to Monsanto Chemical Company, St. Louis, Mo., a corporation of Delaware No Drawing. Application July 22, 1937, Serial No. 155,144

16 Claims. (Cl. 134—39)

The present invention relates to coating compositions and the process of preparing the same. More particularly, the present invention relates to coating compositions containing a drying oil, such as for example paints, varnishes, enamels, linoleums, and the like.

One of the objects of the present invention is to provide a method of preventing premature oxidation of the drying oil composition. A further object of the present invention is to interrupt or retard the continued oxidation of oils, paints, varnishes and the like after they have attained a desirable oxidized condition.

Many types of paints, varnishes and enamels containing drying oils exhibit the objectionable property of developing tough rubber-like films across their upper surfaces when allowed to stand for a relatively short time in open containers. Such films are usually called "skins" and the process of developing this "skin" formation is called "skinning." In paints or enamels containing certain types of pigments, as well as in mixtures containing relatively large proportions of China-wood oil or polymerized linseed oil, this tendency to skin is greatly increased with the result that skins may form on the surface of the mixture even in their unopened containers. This tendency to develop skin formation is particularly undesirable in dipping operations, where the coating composition in the container is required to be exposed to the air for considerable periods of time while the articles to be coated by the paint, varnish, enamel and the like are immersed therein. Furthermore, in the manufacture of paints, varnishes or enamels and the like or materials comprising the same, it is usually customary to incorporate therein a small proportion of a positive oxidation catalyst to diminish the time of drying of the oil so that the composition will dry within a reasonable time after it is spread in a thin film. This positive oxidation catalyst is commonly called a dryer or siccative. These dryers or siccatives induce varying forms of oxidation phenomena some of which are highly advantageous and necessary and others which are undesirable and objectionable. Thus, while the dryer or siccative aids in the drying of the film of the coating composition containing the drying oil, it also increases the tendency of the composition to film or skin in the container, and further may catalyze the oxidation process too far during the drying of the coating composition when in the film form.

According to the present invention the undesirable properties of the so-called dryers and the tendency of drying oil compositions, for example paints, varnishes and the like, to develop skins and undesirable oxidation products have been substantially eliminated by the incorporation of a small proportion of a polyhydroxyl substituted aromatic compound containing at least two condensed benzene nuclei. Preferably the compounds of this invention comprise a dihydroxyl substituted naphthalene and derivatives thereof, as for example the alkyl and aralkyl nuclear substituents thereof.

As one method of operating the present invention, portions of a paint, varnish or enamel, which readily skins on contact with the air were placed in suitable containers, a small proportion of one of the preferred compounds incorporated therein and observations made at regular intervals as to the skinning of the composition.

As a specific embodiment of the present invention 20 grams of a quick drying enamel comprising a 25 gallon China-wood oil varnish containing 2.5% of a mixed lead manganese and cobalt dryer was placed in a wide mouth container having a capacity of 50 c. c. 20 milligrams of 1:5 dihydroxy naphthalene were incorporated therein and a comparison made with the skinning time of the same enamel containing no inhibitor of skin formation, a temperature of 25° C. being maintained throughout the tests. It was noted that, while the enamel which did not contain an inhibitor of skin formation developed a thick skin in one day, even with the small amount of the preferred class of materials, for example 1:5 dihydroxy naphthalene, a skin did not develop in 21 days.

As a further specific embodiment of the present invention showing the use of still smaller concentrations of the preferred inhibitors of this invention, 20 grams of the enamel described above were placed in a suitable open container and 6 milligrams of amyl 1:5 dihydroxy naphthalene incorporated therein. With this low amount of skin preventing substance, a skin did not develop for three days.

Amyl 1:5 dihydroxy naphthalene may be prepared in the well-known way by amylating 1:5 dihydroxy naphthalene by reacting therewith amyl alcohol, amyl halides or amylene.

As further specific embodiments of the present invention 1:5 dihydroxy naphthalene has been reacted with benzyl chloride and butyl alcohol respectively and the resulting benzyl 1:5 dihydroxy naphthalene and butyl 1:5 dihydroxy naphthalene employed as inhibitors of skin formation in conjunction with the quick drying enamel defined above, and found to prevent skin formation for 9 days and 5 days respectively.

As a further specific embodiment of the present invention, into a typical white outside paint there was incorporated 0.05 per cent by weight of one of the preferred class of materials, for example 1:5 dihydroxy naphthalene. The resulting paint composition was brushed on wood test panels and the painted test panels exposed to the weather for six months in Florida, and compared in an identical test with wood test panels coated in the same manner with the same paint exclusive of the added skin inhibiting or anti-oxidizing agent. At the end of the six months test period the panels coated with the paint containing 1:5 dihydroxy naphthalene exhibited only widely scattered microscopic cracks, while the panels coated with the same paint exclusive of any added skin inhibiting or anti-oxidizing substance exhibited areas of cracks visible to the naked eye. It is thus readily apparent that surfaces coated with paints and the like containing relatively small proportions of the compounds of the present invention, for example 1:5 dihydroxy naphthalene, are greatly resistant to weathering and like influences.

Included within the scope of the present invention is the use of methylated, ethylated, propylated and the like nuclear derivatives of polyhydroxyl substituted aromatic compounds containing at least two condensed benzene nuclei. In the place of 1:5 dihydroxy naphthalene disclosed as a specific embodiment of a polyhydroxyl substituted aromatic compound, 2:7 dihydroxy naphthalene, 1:4 dihydroxy naphthalene, 2:6 dihydroxy naphthalene, 2:8 dihydroxy naphthalene, the polyhydroxyl substituted anthracenes as for example 9:10 dihydroxy anthracene and the polyhydroxyl substituted phenanthrenes and their derivatives and preferably their alkyl and aralkyl nuclear derivatives may be so employed.

The amount of the preferred class of materials may be varied depending on the specific composition of the coating material. Generally it is found that less than 1% of the preferred material will be sufficient. Ordinarily from 0.01 to 0.50% is sufficient. It is obvious that the processes and compositions described herein may be varied widely in their details without departing from the spirit or scope of the present invention. The invention is limited solely by the appended claims.

What is claimed is:

1. A coating composition characterized by resistance to skin formation in the bulk condition containing a vegetable drying oil having incorporated therein a positive oxidation catalyst and a controller of oxidation thereof comprising a polyhydroxyl substituted naphthalene.

2. A coating composition characterized by resistance to skin formation in the bulk condition containing a vegetable drying oil having incorporated therein a positive oxidation catalyst and a controller of oxidation thereof comprising a dihydroxy naphthalene.

3. A coating composition characterized by resistance to skin formation in the bulk condition containing a vegetable drying oil having incorporated therein a positive oxidation catalyst and a controller of oxidation thereof comprising dihydroxy naphthalene.

4. A coating composition characterized by resistance to skin formation in the bulk condition containing a vegetable drying oil having incorporated therein a positive oxidation catalyst and a controller of oxidation thereof comprising 1:5 dihydroxy naphthalene.

5. A coating composition characterized by resistance to skin formation in the bulk condition containing a vegetable drying oil having incorporated therein a positive oxidation catalyst and a controller of oxidation thereof comprising an alkylated dihydroxy naphthalene.

6. A coating composition characterized by resistance to skin formation in the bulk condition containing a vegetable drying oil having incorporated therein a positive oxidation catalyst and a controller of oxidation thereof comprising an aralkylated dihydroxy naphthalene.

7. A coating composition characterized by resistance to skin formation in the bulk condition containing a vegetable drying oil having incorporated therein a positive oxidation catalyst and a controller of oxidation thereof comprising amyl 1:5 dihydroxy naphthalene.

8. A coating composition characterized by resistance to skin formation in the bulk condition containing a vegetable drying oil having incorporated therein a positive oxidation catalyst and a controller of oxidation thereof comprising benzyl 1:5 dihydroxy naphthalene.

9. The improvement in the manufacture of coating compositions characterized by resistance to skin formation in the bulk condition which comprises mixing the coating composition of the type which rapidly develops skin formation in the bulk condition containing a vegetable drying oil with a polyhydroxyl substituted naphthalene.

10. The improvement in the manufacture of coating compositions characterized by resistance to skin formation in the bulk condition which comprises mixing the coating composition of the type which rapidly develops skin formation in the bulk condition containing a vegetable drying oil with a dihydroxy naphthalene.

11. The improvement in the manufacture of coating compositions characterized by resistance to skin formation in the bulk condition which comprises mixing the coating composition of the type which rapidly develops skin formation in the bulk condition containing a vegetable drying oil with dihydroxy naphthalene.

12. The improvement in the manufacture of coating compositions characterized by resistance to skin formation in the bulk condition which comprises mixing the coating composition of the type which rapidly develops skin formation in the bulk condition containing a vegetable drying oil with 1:5 dihydroxy naphthalene.

13. The improvement in the manufacture of coating compositions characterized by resistance to skin formation in the bulk condition which comprises mixing the coating composition of the type which rapidly develops skin formation in the bulk condition containing a vegetable drying oil with an alkylated dihydroxy naphthalene.

14. The improvement in the manufacture of coating compositions characterized by resistance to skin formation in the bulk condition which comprises mixing the coating composition of the type which rapidly develops skin formation in the bulk condition containing a vegetable drying oil with an aralkylated dihydroxy naphthalene.

15. The improvement in the manufacture of coating compositions characterized by resistance to skin formation in the bulk condition which comprises mixing the coating composition of the type which rapidly develops skin formation in the bulk condition containing a vegetable drying oil with amyl 1:5 dihydroxy naphthalene.

16. The improvement in the manufacture of coating compositions characterized by resistance to skin formation in the bulk condition which comprises mixing the coating composition of the type which rapidly develops skin formation in the bulk condition containing a vegetable drying oil with benzyl 1:5 dihydroxy naphthalene.

GEORGE D. MARTIN.